N. STANGER.
BAIL GUARD.
APPLICATION FILED APR. 11, 1917.
1,268,775. Patented June 4, 1918.
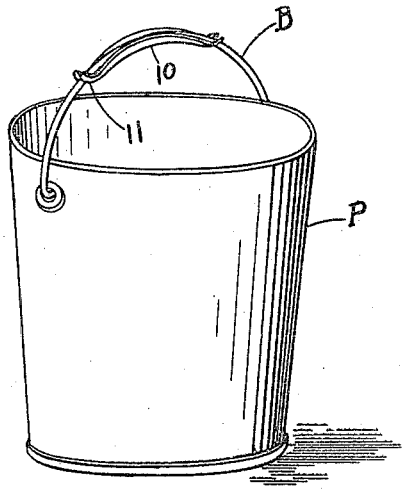
FIG. 5.
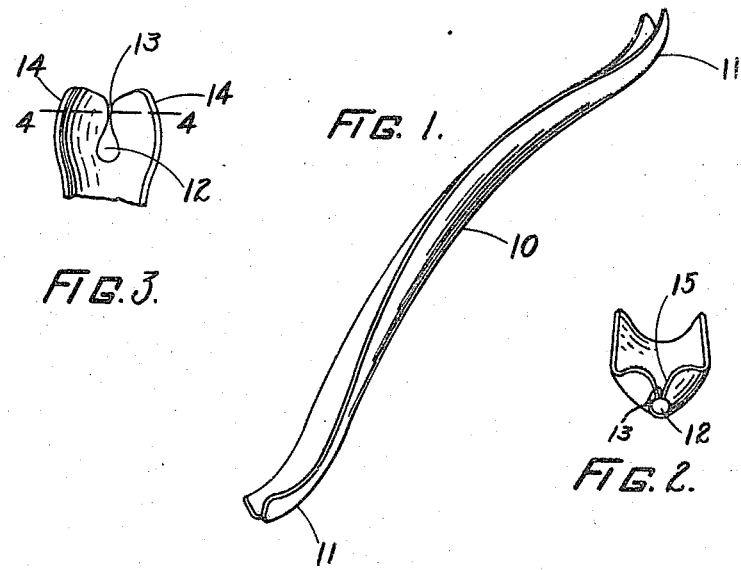
FIG. 3.
FIG. 1.
FIG. 2.
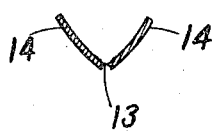
FIG. 4.
INVENTOR,
NATHAN STANGER,
BY Clyde L. Rogers,
his ATTORNEY

UNITED STATES PATENT OFFICE.

NATHAN STANGER, OF MALDEN, MASSACHUSETTS.

BAIL-GUARD.

1,268,775.   Specification of Letters Patent.   Patented June 4, 1918.

Application filed April 11, 1917. Serial No. 161,294.

*To all whom it may concern:*

Be it known that I, NATHAN STANGER, a citizen of the United States, and resident of Malden, county of Middlesex, Commonwealth of Massachusetts, have invented an Improvement in Bail-Guards, of which the following description, in connection with the accompanying drawings, is a specification, like characters on the drawings representing like parts in each of the several views.

This invention relates to a detachable guard or handle adapted to be applied to a bail of wire or the like for carrying a pail or other receptacle, such guard or handle being for the purpose of preventing the bail of a heavy pail from hurting or injuring the hand. More especially the invention is an improvement on the type of bail guard shown in the patent to Ottignon, No. 645,670, patented March 20, 1900. The invention will be better understood from the following detailed description taken in connection with the accompanying drawings and will be thereafter pointed out in the appended claims.

Referring to the drawings:

Figure 1 is a view in perspective showing my improved bail guard;

Fig. 2 is an end view thereof;

Fig. 3 is a plan view of one end of the bail guard;

Fig. 4 is a transverse section on line 4—4 of Fig. 3; and

Fig. 5 is a perspective view showing my improved guard applied to the bail of a pail.

My improved bail guard is represented at 10 composed of a strip of thin material, preferably hard fiber though it might be of metal. This strip is of a length some little greater than the width of the hand and its main central portion is curved in cross section to fit around the bail of the pail, and also curved from end to end to approximate the curve of a pail bail and also to make it of more convenient form to be grasped by the hand. The extremities of the guard are bent up in a somewhat abrupt reverse curve endwise relative to the body portion as at 11 and are slotted some little distance from each end as indicated at 12 with a slit 13 leading from such slot to the end of the guard. The slots 12 and slits 13 form the extremities of the guard into spring jaws or lugs 14 which are adapted to be sprung outward and pressed apart to some little extent to permit the bail B of a pail P to be pressed through the slits 13 at each end of the guard into the slots 12, it being understood that when the jaws 14 are disposed as now to be explained, said slits are somewhat closer together than the diameter of the bail to be engaged. I have found that with the jaw or lug extremities 14 formed as thus far described and as shown in said patent, the said jaws have very little range of spring resiliency and yielding capability to accommodate bails of different sizes for the reason that since they lie flatwise and substantially transverse of the direction of pressure and movement, in applying the same to a bail, there is no provision permitting any elastic yield, but the edgewise set of said jaws and particularly the rear portions thereof causes a maximum resistance to any yielding distortion and tends to break off said jaws or lugs opposite the slot 12 when the guard is to be applied to a bail of any large size, though of a size that should be within the range of the device. It will be understood that this is a serious objection since it is desirable to have the bail guards of a single standard size and shape adapted to be applied to the entire range of bails apt to be encountered in pails that are to be carried. In accordance with my invention I mold and shape the jaws or lugs 14 at the ends of the bail guard so that they are at a substantial angle to each other converging toward the slit at the bottom and presenting a V-shape cross-section as indicated in Fig. 4. This V-shape cross-section and converging relation of the spring jaws extends well back to the rear of the slot 12, in fact merging into the curving cross section of the body of the guard, while at the extremities of the guard a well defined V-shape mouth 15 is thus produced adapted to readily catch the bail and guide it into place. It will be understood that with this converging V-shape relation of the jaws 14, instead of presenting their bail engaging portions edgewise of the bail as it is applied thereto, these jaws in the present case present portions verging toward parallelism with the direction of bail movement, *i. e.*, more nearly tangent to the line of pressure instead of substantially normal of the line of pressure as would be the case were said jaws not verged toward each other. In this way the resilient, yielding capability of the jaws is greatly increased so that they are adapted to spring enough to permit any size of ordinary bail or cord or the like to be passed through the slits 13 without danger of breaking or injuring said jaws. I do not desire to be limited to the precise structural details herein exhibited and I therefore desire the present embodiment to be considered as illustrative and not restrictive, reference being had to the appended claims, rather than to the foregoing description to indicate the scope of the invention.

Having described my invention, what I claim as new and desire to secure by Letters Patent is:

1. A bail guard or handle composed of a longitudinally curved strip of resilient material of concavo-convex form in cross-section and having its ends upturned and provided with slots for the reception of the bail and with longitudinal slits extending outwardly from said slots to the end of the strip, the ends of the strip constituting spring jaws normally disposed at a substantial angle to each other converging toward said slit whereby resilient yielding thereof is promoted, and terminating in flaring V-shape mouths for engaging a bail to guide it into said slots.

2. A bail guard or handle composed of a longitudinally curved strip of resilient fiber of concavo-convex form in cross section and having its ends upturned at a substantial angle, and provided with slots for the reception of the bail and with longitudinal slits extending outwardly from said slots to the end of the strip, the ends of the strip constituting spring jaws normally disposed at a substantial angle to each other converging downward toward said slit whereby resilient yielding thereof is promoted, and the corners of said jaws adjacent said slits cut away to form curving sides of mouths for engaging a bail to guide it into said slots.

3. A bail guard or handle composed of a longitudinally curved strip of resilient material of concavo-convex form in cross section, the end portions thereof provided with slots for the reception of the bail and bent abruptly upward constituting spring jaws, said jaws disposed at a substantial angle to each other converging downward continuously toward said slot whereby resilient yielding thereof is promoted, and terminating in flaring V-shaped mouths for engaging a bail to guide it into said slots.

In testimony whereof, I have signed my name to this specification.

NATHAN STANGER.

Copies of this patent may be obtained for five cents each, by addressing the "Commissioner of Patents, Washington, D. C."